United States Patent Office 2,877,231
Patented Mar. 10, 1959

2,877,231

CERTAIN 3-SUBSTITUTED CYCLOALKANO-[d]-4-THIAZOLINE-2-ONES

George de Stevens, New Providence, N. J., assignor to Ciba Pharmaceutical Products, Inc., Summit, N. J., a corporation of New Jersey No Drawing. Application February 7, 1957
Serial No. 638,689

10 Claims. (Cl. 260—306.7)

This invention relates to certain 4-thiazoline-2-ones, more specifically to 3-R-cycloalkano-[d]-4-thiazoline-2-ones wherein R stands for hydrogen or an organic radical, and the process of their preparation.

An organic radical is especially an unsubstituted hydrocarbon radical having from 1 to 10 carbon atoms, such as a lower alkyl radical, e. g., methyl, ethyl, propyl, isopropyl, butyl, isobutyl, tertiary butyl, pentyl or neopentyl; a lower alkenyl radical, e. g. allyl or methallyl; a lower alkinyl radical, e. g. propargyl; a mononuclear lower cycloalkyl radical, e. g. cyclopentyl or cyclohexyl; a mononuclear lower cycloalkyl-lower alkyl radical, e. g. cyclohexylethyl or cyclopentyl-propyl; an aryl radical, e. g. phenyl or naphthyl; or a mononuclear aryl-lower alkyl radical, e. g. benzyl or phenylethyl.

Furthermore, R stands also for a hydrocarbon radical substituted by at least one functional group such as a nitro, an amino, an imino, a hydroxyl, an etherified hydroxyl, an esterified hydroxyl, an oxido or a carbamyl or an esterified sulfonyl group or a halogen atom.

Hydrocarbon radicals containing an amino group are more especially lower alkyl radicals with a tertiary amino group, such as an N,N-di-lower alkyl-amino group, e. g. dimethylamino, diethylamino or dibutylamino; or an N,N-lower alkylene-amino group, the alkylene chain of which contains from 4 to 6 carbon atoms and which may be arranged in a straight chain or be interrupted by a hetero atom such as a sulfur, oxygen or nitrogen atom; together with the nitrogen atom, such alkylene chains form, for example, the pyrrolidino, piperidino, hexamethyleneamino, morpholino, thiamorpholino or a piperazino radical. Such N,N-alkylenamino radicals may be also substituted by additional substituents such as carboxy, carbo-lower alkoxy, cyano, acyl or aryl groups and may form, for example, a 4-phenyl-4-carbethoxy-piperidino radical. Other hydrocarbon radicals which may contain amino groups are mononuclear aryl or mononuclear aryl-lower alkyl radicals, which may be represented, for example, by the 4-aminophenyl or 4-aminophenylethyl radicals. An imino group is preferably attached to a carbon atom containing an amino group, thus forming together with such a carbon atom an amidino group.

Nitro groups are preferably attached to mononuclear aryl or mononuclear aryl-lower alkyl radicals, such as phenyl or phenylethyl radicals.

Hydroxyl groups are especially attached to lower alkyl radicals, and such radicals may be represented by hydroxy-ethyl or 2,3-dihydroxypropyl. These hydroxy groups may be esterified by an acid, such as a lower alkanoic acid, e. g. acetic acid; or may be etherified by an unsubstituted or substituted hydrocarbon radical such as a lower alkyl or a monoaryl radical, e. g., phenyl, 4-aminophenyl or 4-nitrophenyl radical. Oxido groups are preferably located in lower alkyl radicals, which may be represented for example, by the 2,3-oxidopropyl radical.

Esterified sulfonyl groups, preferably attached to a lower alkyl radical, are esterified with a lower alkanol, e. g. methanol, and such radicals may be represented by the methyl sulfonyl-ethyl radical.

Carbamyl groups are primarily N,N-disubstituted carbamyl groups, such as the N,N-diethyl carbamyl group, which may be attached to lower alkyl radicals, e. g. methyl or ethyl.

Although the alkylene chain of the cycloalkano ring is preferably unsubstituted, it may contain as substituents lower hydrocarbon radicals, e. g., lower alkyl radicals such as methyl, ethyl, propyl, or isopropyl; or cycloalkyl radicals such as cyclopentyl or cyclohexyl; or lower alkylene groups which may be attached to the saturated ring to form a conventional, an endo or a spiro ring.

3-R-cycloalkano-[d]-4-thiazoline-2-ones, in which R contains a salt-forming group such as an amino or an imino group, may be also obtained in the form of their salts, such as their therapeutically useful acid addition salts. Such salts are those with inorganic acids, e. g. hydrochloric, hydrobromic, hydriodic, perchloric, nitric or thiocyanic acid, or sulfuric or phosphoric acids; or with organic acids, e. g. formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, p-aminobenzoic, p-hydroxybenzoic, anthranilic, cinnamic, mandelic, salicylic, p-aminosalicylic, 2-phenoxybenzoic, 2-acetoxybenzoic, methane sulfonic, ethane sulfonic, hydroxyethane sulfonic, ethylene sulfonic, benzene sulfonic, p-toluene-sulfonic, naphthalene sulfonic, or sulfanilic acid or methionine, trypthophane, lysine or arginine.

3-R-cycloalkano-[d]-4-thiazoline-2-ones, in which R is a substituent containing a tertiary amino group, may also be in the form of their quaternary ammonium compounds, particularly the lower alkyl halides, e. g. methiodides, ethobromides or propylchlorides; the lower alkenyl halides, e. g. allyl bromides; or di-lower alkylsulfates, e. g. dimethyl- or diethylsulfates; or the corresponding hydroxides.

The new 3-R-cycloalkano-[d]-4-thiazoline-2-ones exhibit analgesic activity and can be used as medicaments for the alleviation of pain. Especially valuable are the compounds of the formula:

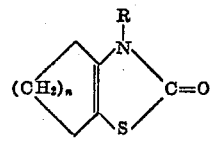

wherein R stands for hydrogen or lower alkyl, primarily methyl, and wherein n represents a whole number from 1 to 3 and above all, the 3-methyl-cyclopentano-[d]-4-thiazoline-2-one of the formula:

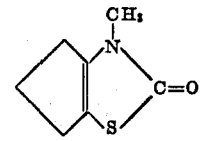

the 3-methyl-cyclohexano-[d]-4-thiazoline-2-one of the formula:

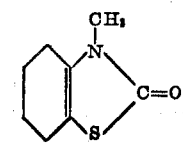

and the 3-methyl-cycloheptano-[d]-4-thiazoline-2-one of the formula:

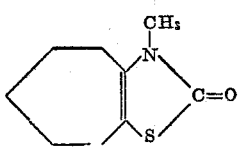

as well as the corresponding N-unsubstituted derivatives.

The new compounds can be used as medicaments in the form of pharmaceutical preparations, which contain the new compounds in admixture with a pharmaceutical, organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly, or any other known carrier for medicaments. The pharmaceutical preparations may be, for example, in the form of tablets or dragees or in liquid form as solutions. If desired, they may contain auxiliary substances, such as preserving agents, stabilizing agents, salts for varying the osmotic pressure or buffers. They may also contain, in combination, other therapeutically useful substances. The new compositions contain preferably from about 0.05 mg. to about 300 mg. of the new active compounds per dosage unit. The actual dose administered in therapy depends largely on the condition of the individual patient and the desires of the practicing physician.

The new 3-R-cycloalkano-[d]-4-thiazoline-2-ones, in which R stands for hydrogen or an organic radical, may generally be prepared by forming the heterocyclic ring, and/or, if desired, modifying the substituents on the heterocyclic ring.

Thus, the new compounds of this invention may be prepared by treating a cycloalkanone, which contains in the 2-position a halogen atom, e. g. chlorine, bromine or iodine, with a salt or an ester of an N–R-thiocarbamic acid, in which R has the above mentioned meaning, and, if desired, converting R attached to the nitrogen atom into another radical. A salt of an N–R-thiocarbamic acid is, for example, an alkali metal salt, e. g., a sodium or a potassium salt; or particularly the ammonium salt. An ester of an N–R-thiocarbamic acid is more especially a lower alkyl ester, e. g. methyl, ethyl, propyl, isopropyl or butyl ester. The reaction may be carried out particularly in the absence or in the presence of a solvent, e. g. ethanol, propanol, isopropanol, or butanol, at room temperature or preferably at an elevated temperature from about 50 to about 250° C., especially from about 120° to about 180°, in an open vessel or in a closed vessel under pressure and, if necessary, in the atmosphere of an inert gas, e. g. nitrogen.

The starting materials for this reaction are known or may be prepared by methods analogous to those known. Thus, an N–R-thiocarbamic acid lower alkyl ester may be prepared by reacting carbon disulfide with a lower alkanol and treating the lower alkyl xanthate with an amine of the formula R—NH₂, wherein R stands for hydrogen or an organic radical.

The starting materials used in this process may also be formed in reactions where conditions apply which convert them into the desired end products according to one of the above-described processes. Thus, 2-chlorocycloalkanone, for example, may be reacted with ethyl thiocarbamate which presumably results in the intermediary formation of 2-ethoxy-cycloalkano-[d]-thiazole which during the course of the reaction is decomposed to the cycloalkano-[d]-4-thiazoline-2-one.

In the 3-R-cycloalko-[d]-4-thiazoline-2-ones obtained, R may be subsequently modified. If R stands for hydrogen lower hydrocarbon radicals, which may be unsubstituted or substituted by one of the substituents outlined previously, may be introduced by per se conventional methods, e. g. by reaction of the 3-H-cycloalkano-[d]-4-thiazoline-2-one with a reactive ester formed by a lower hydrocarbon radical containing a hydroxyl group with a strong acid. Especially contemplated as such esters are hydrocarbon radicals containing a reactive halogen atom such as lower alkyl halides, e. g. methyl iodide methyl bromide or methyl chloride, ethyl bromide, propyl chloride, isopropyl bromide, or butyl chloride; lower alkenyl halides, e. g. allylbromide; lower alkinyl halides, e. g. propargyl bromide; aralkyl halides, e. g. benzyl chloride or phenylethylchloride; cycloalkylhalides, e. g. cyclo-hexylchloride; cycloalkylalkyl halides, e. g. cyclohexylethyl bromide or cyclopentylpropylchloride; or lower hydrocarbon radicals containing in addition to the reactive halogen atom other substituents such as, for example, a nitro, an amino, a hydroxyl, an etherified hydroxyl, an oxido, an esterified sulfonyl or a carbamyl group or a non-reactive halogen atom. Furthermore, esterified aryl sulfonic acids may be used as reagents to replace the hydrogen attached to the ring nitrogen atom, especially lower alkyl aryl sulfonates, e. g. methyl p-toluene sulfonate, methyl p-bromobenzene sulfonate, ethyl or propyl p-toluene sulfonate; lower alkenyl aryl sulfonates, e. g. allyl p-toluene sulfonate, or benzyl aryl sulfonates, e. g. benzyl p-toluene sulfonate. Moreover, di-lower hydrocarbonsulfates may be employed in replacing the hydrogen attached to the ring nitrogen atom, for example, di-lower alkyl sulfates, e. g. dimethylsulfate or diethylsulfate.

For the purpose of replacing the hydrogen attached to the nitrogen atom of the thiazoline ring by an organic radical, the 3-H-cycloalkano-[d]-4-thiazoline-2-ones are preferably used in the form of their metal salts, e. g. alkali metal salts such as sodium or potassium salts, or in the presence of agents capable of forming such salts with the 4-thiazoline-2-ones, or in the presence of strongly basic condensing agents, such as alkali metal hydroxides, e. g. sodium or potassium hydroxide, or trimethyl benzyl ammonium hydroxide. The alkali metal salts may be obtained, for example, by treatment with amides, hydrides, or alcolates of alkali metals such as sodium or potassium amide, sodium hydride, or sodium or potassium ethylate, propylate or isopropylate. The introduction of the organic radical is conveniently carried out in a diluent such as an aromatic hydrocarbon, e. g. benzene or toluene, or a lower alkanol, e. g. methanol, ethanol or propanol.

Furthermore, substituents in the 3-R-cycloalkano-[d]-4-thiazoline-2-ones, R standing for an organic radical, may subsequently be modified. For example, a nitro group may be reduced to an amino group, especially by catalytic hydrogenation, e. g. by treatment with hydrogen in the presence of a catalyst of the eighth group of the periodic system, such as platinum oxide or Raney nickel. Or, a hydroxyl group may be esterified with an acid, especially a lower alkanoic acid, e. g. acetic acid, preferably in the presence of catalytic amounts of a mineral acid, e. g. sulfuric acid. An oxido group may be split, for example, by treatment with an acid to form an ester alcohol. Other groups, such as, for example, carboxy, carbo-lower alkoxy or cyano groups, may be converted into other functional groups, such as, for example, carboxyl ester, carboxy or carbamyl groups, by known methods.

A second variation of the general process for the preparation of the new 3-R-cycloalkano-[d]-4-thiazoline-2-ones, in which R stands for hydrogen or an organic radical, comprises treating a 2-thiacyano-cycloalkanone with a hydrolizing agent to form a 3-H-cycloalkano-[d]-4-thiazoline-2-one, and, if desired, replacing the hydrogen atom of the nitrogen atom by an organic radical.

Hydrolyzing agents in the above reaction are, for example, aqueous mineral acids such as hydrochloric or sulfuric acid, or aqueous alkaline agents, such as aqueous solutions of alkali or alkaline earth hydroxides, carbonates or bicarbonates, e. g. sodium hydroxide or potassium carbonate. The treatment with these hydrolyzing agents usually brings about hydrolysis and ring closure in one operation. However, the formation of the thiazoline ring can also be carried out step-wise by first hydrolyzing the thiocyano compound under mild conditions to the corresponding carbamylthio compound, for example, by treatment with an alkaline hydrolyzing agent as described above and then cyclizing, for example, by treatment with a mineral acid or by heating. The reaction is performed at room temperature or preferably at an elevated temperature from 50° to 200° C., in an open vessel or in a closed vessel under pressure and, if desired, in the atmosphere of an inert gas such as nitrogen. This process is particularly suitable for the hydrolysis of a 2-thiocyano-cyclohexanone, whereas it does not give satisfactory results with the corresponding 2-thiocyano-cyclopentanone and 2-thiocyano-cycloheptanone.

The 2-thiocyano-cycloalkanones used as the starting materials are known or may be, for example, prepared by reacting a 2-halogeno-cycloalkanone, such as a 2-chloro- or a 2-bromo-cycloalkanone with ammonium thiocyanate or the thiocyanate of an alkali metal or an alkaline earth metal, e. g. sodium, potassium, calcium or preferably barium thiocyanate.

The hydrogen atom attached to the ring nitrogen atom may be replaced by an organic radical; this replacement is carried out according to methods analogous to those known, such as those described previously.

A third modification of the general process for the preparation of 3-R-cycloalkano-[d]-4-thiazoline-2-ones, in which R stands for hydrogen or an organic radical, consists in treating a 2-B-cycloalkano-[d]-thiazole, in which the radical B stands for a substituent convertible into an oxo group or a hydroxyl group, in such a way that the radical B is so converted and, if desired, subsequently modifying in the 3-R-cycloalkano-[d]-4-thiazoline-2-one obtained any substituent R. Radicals B convertible into an oxo group are, for example, an esterified or etherified hydroxyl group, a free or substituted amino group, a free or substituted imino group, or a free or substituted methylene group. In these compounds, hydrogen atoms being part of the substituent B or of a group formed in the reaction or attached to the ring nitrogen atom, may give rise to tautomerism by shifting to the neighboring atom, thus accommodating the double bond.

Etherified hydroxyl groups, such as lower alkoxy groups or esterified hydroxyl groups, such as halogen atoms, are hydrolized in the usual manner, e. g. by treatment with alkali or strong acids respectively. If the esterified hydroxyl group is a halogen atom, e. g. chlorine or bromine, it can be converted directly into the oxo group by treatment with metal hydroxides, for example, silver hydroxide or may be first converted into an etherified hydroxyl group such as an alkoxy group by treatment with a metal alcoholate such as sodium methylate or ethylate. The alkoxy group is then split, for example, by treatment with hydrochloric acid. These steps can also be combined by treating a 2-halogeno-cycloalkano-[d]-thiazole with the desired alcohol and a strong acid, such as ethanol and hydrochloric acid. The conversion of the alkoxy group into the oxo group may also be accomplished by isomerization of a corresponding 2-alkoxy-thiazole derivative in an acidic medium under simultaneous alkylation of the nitrogen atom.

A free amino group may be diazotized and then decomposed, e. g. by treatment with phosphoric acid or by heating to yield the hydroxy compound. Furthermore, a free amino group may be diazotized and the diazo compound decomposed in the presence of a cupric halogenide, e. g. chloride, and the halogen, e. g. chlorine atom, thus introduced, may be converted into the oxo group according to the above described method. Furthermore, a 2-amino-cycloalkano-[d]-thiazole may be converted into a 2-imino-3-R-cycloalkano-[d]-4-thiazoline, in which R stands for an organic radical, especially for lower alkyl, e. g. methyl, by treatment with an R-halogenide, especially a lower alkyl halide, e. g. methyliodide. After nitrosation of the 2-imino-compound with nitrous acid, formed by reacting an alkali metal nitrite, e. g. sodium nitrite, with a lower alkanoic acid, e. g. glacial acetic acid, the 2-nitrosoimino-3-R-cycloalkano-[d]-4-thiazoline is decomposed at a temperature ranging from about 50° C. to 250° C., preferably in a high-boiling solvent, such as a high-boiling hydrocarbon, e. g. xylene, and yields directly the 3-R-cycloalkano-[d]-4-thiazoline-2-one, in which R stands for an organic radical, especially lower alkyl, e. g. methyl.

A free amino group or substituted amino group such as, for example, an anilino group, may be converted into the oxo group by treatment with hydrolyzing agents, e. g. strong acids such as sulfuric acid in alcoholic solution. Furthermore, a substituted imino group such as the phenylimino group undergoes the same hydrolysis; upon treatment with hydrochloric acid in ethanol the desired 4-thiazoline-2-one is formed.

An unsubstituted or substituted methylene group in 2-position may be oxidatively degraded to the oxo groups, e. g. by treatment with chromic acid. A substituted methylene group is more especially the dicarbalkoxy-methylene group.

The starting materials in these reactions are known or may be prepared according to known procedures. Thus, the 2-amino-cycloalkano-[d]-thiazoles may be, for example, prepared by reacting a 2-chloro cycloalkanone with thiourea at a temperature from about 100° to 150° and isolating upon chilling the hydrochloride salt of the 2-amino-cycloalkano-[d]-thiazole.

Depending on the conditions used, the 3-R-cycloalkano-[d]-4-thiazoline-2-ones in which R stands for a substituent containing a salt forming group, such as an amino group, may be obtained in the form of the free bases or the salts thereof. The salts may be converted into the free bases, for example, by reaction with an alkaline reagent, e. g. sodium or potassium hydroxide. The free bases may be transformed into their therapeutically useful acid addition salts by reaction with the appropriate inorganic acids such as hydrohalic acids, e. g. hydrochloric, hydrobromic or hydriodic acid; perchloric, nitric or thiocyanic acid, or sulfuric or phosphoric acids; or organic acids such as formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, p-aminobenzoic, p-hydroxybenzoic, anthranilic, cinnamic, mandelic, salicylic, p-amino-salicylic, 2-phenoxy- or 2-acetoxy-benzoic acid, methane sulfonic, ethane sulfonic, hydroxyethane sulfonic, benzene, toluene or naphthalene sulfonic or sulfanilic acid or methionine, tryptophane, lysine or arginine.

3-R-cycloalkano-[d]-4-thiazoline-2-ones, in which R stands for a substituent containing a tertiary amino group, may be convered into the quaternary ammonium compounds by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e. g. hydrochloric, hydrobromic, hydriodic, or sulfuric acid. Such esters are specifically lower alkyl halides, e. g. methyliodide, ethylbromide or propylchloride; lower alkenyl halides, e. g. allyl bromide; di-lower alkyl-sulfates, e. g. dimethyl or diethyl sulfate; or lower alkyl aryl sulfonates, e. g. methyl p-toluene sulfonate. The quaternizing reactions, such as outlined above, are performed in the presence or absence of a solvent, at room temperature or under cooling, at atmospheric pressure or in a closed vessel under pressure. Suitable solvents are more especially alkanols, e. g.

methanol, ethanol, propanol, isopropanol or amyl alcohol; or organic acid amides, e. g. formamide or dimethylformamide. When lower alkyl halides are used as quaternizing agents, formamide and dimethylformamide are preferred solvents and the reaction is advantageously run in a closed vessel under pressure, the latter being built up by heating.

Quaternary ammonium compounds obtained may be converted into the corresponding quaternary ammonium hydroxides, for example, by reaction of the quaternary ammonium halides obtained with silver oxide, or by reaction of the sulfates with barium hydroxide or by treating the quaternary salts with an anion exchanger or by electrodialysis. From any resulting base there may be formed therapeutically suitable quaternary ammonium salts by reaction with the acids, for example, with inorganic acids such as hydrohalic acids, e. g. hydrochloric, hydrobromic or hydriodic acid, sulfuric, phosphoric, nitric, or thiocyanic acid; or organic acids, such as acetic, propionic, glycolic, lactic, pyruvic, oxalic, malonic, succinic, maleic, fumaric, malic, citric, tartaric, benzoic, cinnamic, mandelic, salicylic, 2-acetoxy-benzoic, 2-phenoxy-benzoic, p-aminosalicylic acid, p-toluene-sulfonic, methane sulfonic, ethane sulfonic or hydroxyethane sulfonic acid; or mono-lower alkyl sulfates such as methyl or ethyl sulfate. A quaternary ammonium compound obtained may also be converted into another quaternary salt directly without conversion into the quaternary hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydous methanol.

The invention also comprises any modification of the general process wherein a compound obtainable as an intermediate at any stage of the process is used as starting material and the remaining step(s) of the process are carried out, as well as any new intermediates.

In the process of this invention such starting materials are preferably used which lead to final products mentioned in the beginning as preferred embodiments of the invention.

This application is a continuation-in-part of my copending applications Serial No. 576,542, filed April 6, 1956 (now abandoned), and Serial No. 597,071, filed July 11, 1956 (now abandoned).

The following examples are intended to illustrate the invention. They are not to be construed as limitations thereon. Temperatures are given in degrees centigrade.

*Example 1*

A mixture of 100 g. of 2-chlorocyclohexanone and 150 g. of barium thiocyanate in 250 ml. of absolute ethyl alcohol is stirred at room temperature for 72 hours and then diluted with 250 ml. of water. The solution is extracted with ether. The ether is evaporated off on the steam bath to leave 95 g. of oily 2-thiocyanocyclohexanone. 95 g. of the latter are refluxed with stirring for 24 hours with 1500 ml. of water and 250 ml. 5 N hydrochloric acid. After chilling overnight, the crystalline product is collected on a funnel and dried under reduced pressure. The cyclohexano-[d]-4-thiazoline-2-one of the formula:

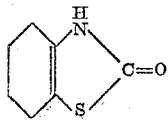

can be recrystallized from ether or from water to give 24 g. of white crystalline powder, M. P. 138–140°.

*Example 2*

5 g. of cyclohexano-[d]-4-thiazoline-2-one are added to a solution of 0.74 g. of sodium in 10 ml. of methanol. To this solution there are added 6.9 g. of methyliodide. The mixture is refluxed gently for four hours. After evaporating off the alcohol under reduced pressure, the oily residue is triturated with ether and the precipitated sodium iodide is filtered off. The filtrate is evaporated to dryness at reduced pressure to give 3-methyl-cyclohexano-[d]-4-thiazoline-2-one of the formula:

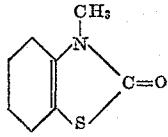

which after recrystallization from petroleum ether melts at 63–64°.

*Example 3*

7 g. of cyclohexano-[d]-4-thiazoline-2-one are dissolved in a solution containing 1.03 g. of sodium in 15 ml. of ethanol. To this solution there are added 10 g. of ethyl iodide and the mixture refluxed for five hours. After standing at room temperature overnight, the ethanol is distilled off under reduced pressure and the residue triturated with ether. The sodium iodide precipitate is filtered off and the ether of the solution evaporated to dryness under reduced pressure. The oily residue is distilled at 118–120° at 1 mm. yielding 3-ethyl-cyclohexano-[d]-4-thiazoline-2-one of the formula:

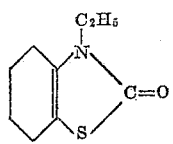

*Example 4*

4 g. of cyclohexano-[d]-4-thiazoline-2-one are added to a solution of 0.6 g. of sodium in 15 ml. of ethanol. To this there are added 3.12 g. of allyl bromide and the mixture is refluxed overnight. The sodium bromide precipitate is filtered off and the ethanol removed under reduced pressure. The oily residue is distilled, the 3-allyl-cyclohexano-[d]-4-thiazoline-2-one of the formula:

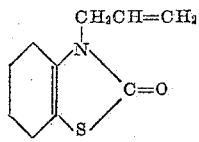

boiling at 124–126°/1 mm.

*Example 5*

A mixture of 11.8 g. of 2-chlorocyclopentanone and 11.5 g. of ethyl thiocarbamate is heated slowly on the steam bath. At 85° a vigorous reaction takes place, the temperature rising to 100°. The mixture is cooled to 85° and the reaction temperature is maintained at 85–90° for 40 minutes. The viscous melt obtained is dissolved in 20 ml. of acetone and then triturated with 400 ml. of ether. An amorphous tan powder is filtered off, washed with ether and after sublimation at 125–130°/0.001 mm. cyclopentano-[d]-4-thiazoline-2-one of the formula:

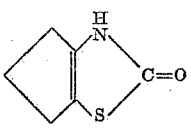

is obtained as a white crystalline powder, which after recrystallization from water melts at 144–145.5°.

*Example 6*

To 10.2 g. of α-chlorocycloheptanone are added 7.35 g. of ethyl thiocarbamate and the mixture is heated for two hours at 130° and for an additional two hours at 140°. After chilling the viscous melt is triturated with 40 ml. of acetone. After chilling overnight a crystalline precipitate is filtered off and washed with a small amount of cold acetone. White crystalline plates of cycloheptano-[d]-4-thiazoline-2-one of the formula:

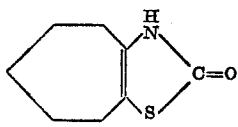

are obtained upon recrystallization from water with Norite, melting at 139–140°.

*Example 7*

A mixture of 49.3 g. (0.485 mole) of α-chlorocyclopentanone and 52.0 g. (0.5 mole) ethyl thiocarbamate in 125 ml. of n-propanol is refluxed for 3.5 hours. The reaction mixture is then cooled to room temperature and filtered. The n-propanol is distilled off from the filtrate leaving a dark-brown viscous residue which is heated at 130–140° at 15 mm. for 25 minutes. The cooled residue is thoroughly extracted with ether. Upon evaporation of the ether a crystalline residue is obtained which is collected on a filter and recrystallized from water-ethyl alcohol (9:1). The cyclopentano-[d]-4-thiazoline-2-one melts at 144–145° and is identical to the product obtained according to the procedure described in Example 5.

*Example 8*

140 g. (1 mole) of cyclopentano-[d]-thiazoline-2-one is dissolved in 6 liters of methanol containing 23 g. (1 mole) of sodium. 170 g. of methyliodide are added and the solution is refluxed gently for 5 hours. At the end of this time 50 ml. of methyliodide are added and the solution is allowed to stand at room temperature overnight. The methanol and excess methyliodide are stripped off at reduced pressure and the residue is thoroughly extracted with ether. The ether extract is dried over anhydrous calcium sulfate. Removal of the ether yields a semi-solid material which is distilled. The desired N-methyl-cyclopentano-[d]-4-thiazoline-2-one of the formula:

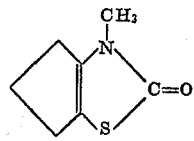

is collected at 120°/0.35 mm. in 80 percent yield. The product is recrystallized from 10 percent ethyl alcohol to give a white crystalline powder, M. P. 69–71°.

*Example 9*

0.250 g. of cycloheptano-[d]-4-thiazoline-2-one is dissolved in 20 ml. of methanol containing 0.036 g. of sodium. The solution is refluxed gently for 3½ hours. The methanol is removed under reduced pressure and the residue is thoroughly extracted with ether. After drying the ether extract over calcium sulfate, the ether is evaporated off. The remaining crystals are recrystallized from hot water to give fine, white needles of N-methyl-cycloheptano-[d]-4-thiazoline-2-one of the formula:

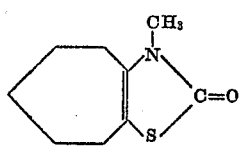

melting at 60–61°.

*Example 10*

2.1 g. of cyclohexano-[d]-4-thiazoline-3-one are dissolved in a solution of 0.3 g. of sodium in 10 ml. of isopropanol and to this solution are added 2.0 g. of diethylaminoethylchloride. After refluxing for 4 hours and filtration the isopropanol is evaporated off under reduced pressure and the residue is distilled. The 3-diethylaminoethyl-cyclohexano-[d]-4-thiazoline-2-one of the formula:

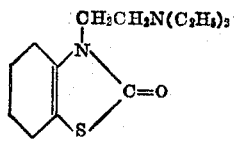

distils at 144°/0.22 mm.

The hydrochloride is formed by adding dry hydrochloric acid gas to an ether solution of the above compound, M. P. 169°.

*Example 11*

1.33 g. of cyclohexano-[d]-4-thiazoline-2-one are added to a suspension of 0.31 g. of sodamide in 30 ml. of dry toluene. The mixture is refluxed for 6 hours, 1.2 g. of 2-dimethylaminopropylchloride are added and the mixture is refluxed for 17 hours. After filtering the toluene is evaporated off under reduced pressure and the remaining residue is distilled to give 1.1 g. of 3-(2-dimethylaminopropyl)-cyclohexano-[d]-4-thiazoline-2-one of the formula:

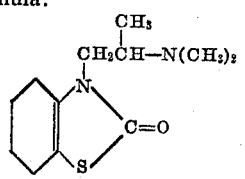

B. P. 132–134°/0.27 mm.

The hydrochloride of the 3-(2-dimethyl-aminopropyl)-cyclohexano-[d]-4-thiazoline-2-one may be prepared according to Example 10. Salts with organic acids may be prepared by adding the organic acid, e. g. oxalic acid, tartaric acid, etc. to an ethanolic solution of the free base.

*Example 12*

2.1 g. of cyclohexano-[d]-4-thiazoline-2-one are added to a suspension of 0.48 g. of sodamide in 40 ml. of dry toluene, and after refluxing for 6 hours, 2.0 g. of 3-dimethylaminopropylchloride are added. The reaction is carried out as described in Example 11, and the 3-(dimethylaminopropyl)-cyclohexano-[d]-4-thiazoline-2-one of the formula:

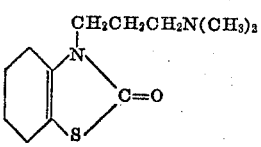

is distilled, B. P. 130–132°/0.22 mm.

The methiodide is prepared by reacting together equimolar quantities of the 3-(3-dimethylaminopropyl)-cyclohexano-[d]-4-thiazoline-2-one and methyliodide, M. P. 185–190°.

*Example 13*

A mixture of 2.1 g. of cyclohexano-[d]-4-thiazoline-2-one and 0.48 g. of sodamide in 40 ml. of toluene is refluxed for six hours. 2.0 g. of diethylaminoethylchloride are added, refluxing is continued for an additional 12 hours and the reaction mixture is worked up as outlined in Example 11. The 3-diethylaminoethyl-cyclohexano-[d]-4-thiazoline-2-one of the formula:

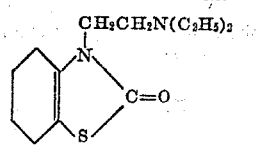

is obtained as yellow glassy oil, B. P. 140–143°/0.4 mm.

*Example 14*

4.2 g. of cyclopentano-[d]-4-thiazoline-2-one are added to a mixture of 1.0 g. of sodamide in 80 ml. of dry toluene. The solution is refluxed for 12 hours, and an equimolar amount of 3-dimethylaminopropylchloride is added and refluxing is continued for 21 hours. The mixture is filtered hot, the solvent is distilled off and the remaining 3-(3-dimethylaminopropyl)-cyclopentano-[d]-4-thiazoline-2-one of the formula:

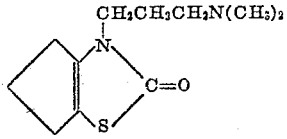

is distilled, B. P. 140°/0.4 mm.

The methiodide of this compound is prepared by dissolving the base in a solution of methyliodide in acetone and melts at 136°.

Example 15

4.2 g. of cyclopentano-[d]-4-thiazoline-2-one are added to a solution of 0.69 g. of sodium dissolved in 80 ml. of dry isopropanol. 5 ml. of 2-dimethylaminopropylchloride, dissolved in toluene, are added and the solution is refluxed for 24 hours. The sodium chloride is filtered off and the solvent evaporated under reduced pressure. The residue is extracted with ether, the ethereal solution dried over potassium carbonate, filtered and the ether distilled off. The 3-(2-dimethylaminopropyl)-cyclopentano-[d]-4-thiazoline-2-one of the formula:

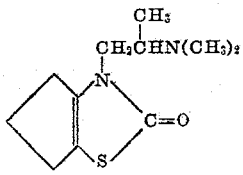

is distilled, B. P. 139/0.45 mm.

The methiodide of the tertiary base is prepared according to the procedure given in Example 13.

Example 16

6.2 g. of cyclohexano-[d]-4-thiazoline-2-one are added to 100 ml. of dry toluene containing 1.56 g. of sodamide. The mixture is refluxed for 6 hours, and 6.3 g. of methylsulfonyl-ethylchloride are added, and refluxing is continued for an additional 17 hours. After filtration the toluene is removed under reduced pressure and the 3-(methyl-sulfonylethyl)-cyclohexano-[d]-4-thiazoline-2-one of the formula:

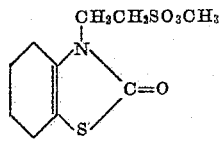

is distilled, B. P. 146/0.35 mm., yielding 3.3 g. of the product.

Example 17

3.1 g. of cyclohexano-[d]-4-thiazoline-2-one are added to a mixture of 0.75 g. of sodamide in 80 ml. of dry toluene and the mixture is refluxed for 10 hours. 3.8 g. of cyclohexanoethylbromide are added and refluxing is continued for 32 hours. The solution is filtered and the toluene evaporated off. The remaining residue is recrystallized from a benzene-petroleum ether mixture and the 3-cyclohexanoethyl-cyclohexano-[d]-4-thiazoline-2-one of the formula:

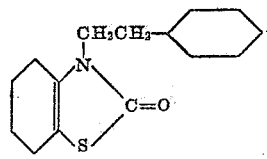

melts at 87–88°.

Example 18

4.2 g. of cyclopentano-[d]-4-thiazoline-2-one are refluxed with a solution of 0.69 g. of sodium in 60 ml. of isopropanol for 10 hours. 5.75 g. of cyclohexanoethylbromide are added and the mixture is refluxed for an additional 5 hours. After removal of the solvent the residue is extracted with dry ether and the ether is evaporated off. The 3-cyclohexanoethyl-cyclopentano-[d]-4-thiazoline-2-one of the formula:

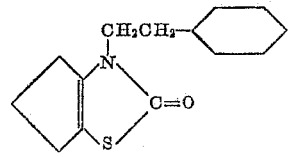

is distilled to yield 95 percent of the product, B. P. 150–154°/0.17 mm.

Example 19

4.2 g. of cyclopentano-[d]-4-thiazoline-2-one are dissolved in 60 ml. of isopropanol containing 0.69 g. of sodium. The solution is refluxed one hour, whereupon 7.0 g. of phenylethyliodide are added, and the solution is refluxed for an additional 5 hours. After removal of the solvent under reduced pressure, the residue is extracted with dry ether, the ether evaporated off and the remaining oil taken up in a mixture of benzene and petroleum ether. Upon concentration of the solvent, the 3-phenylethyl-cyclopentano-[d]-4-thiazoline-2-one of the formula:

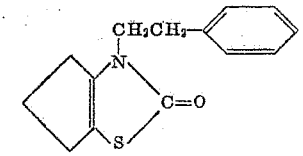

crystallizes in fine white crystals, M. P. 93–95°.

Example 20

3.3 g. of cyclopentano-[d]-4-thiazoline-2-one are added to 0.6 g. of sodium in 70 ml. of isopropanol. After refluxing for 30 minutes, 3.3 g. of 3-bromopropanol are added and the solution is refluxed for 7 hours. The solvent is then evaporated off and the remaining residue taken up in ether. Evaporation of the ether gives the 3-(3-hydroxypropyl)-cyclopentano-[d]-4-thiazoline-2-one of the formula:

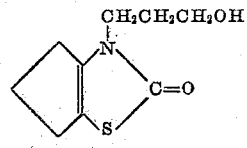

which distills at 150–155°/0.17 mm.

Example 21

4.2 g. of cyclohexano-[d]-4-thiazoline-2-one are added to a solution of 0.64 g. of sodium in 80 ml. of isopropanol and the solution is refluxed for one hour. 6.2 g. of phenylethyliodide are added and the mixture refluxed for 20 hours. The 3-phenylethyl-cyclohexano-[d]-4-thiazoline-2-one of the formula:

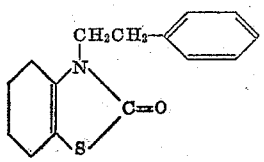

is obtained according to the procedure outlined in Example 19, M. P. 91–93°.

Example 22

4.2 g. of cyclopentano-[d]-4-thiazoline-2-one are added to a solution of 0.69 g. of sodium dissolved in 250 ml. of isopropanol. 5 g. of ethyliodide are added and the mixture is refluxed for 20 hours. The solvent is then removed and the residue extracted with ether. After evaporation of the ether the 3-ethyl-cyclopentano-[d]-4-thiazoline of the formula:

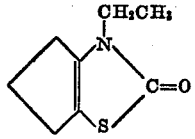

is distilled, B. P. 102–104°/0.2 mm.

*Example 23*

A mixture of 2.15 g. of cyclopentano-[d]-4-thiazoline-2-one and 0.4 g. of sodium in 50 ml. of isopropanol is refluxed for 5 hours and after the addition of 4 g. of allylbromide, refluxing is continued for an additional 20 hours. The reaction mixture is worked up as described in Example 22, and the 3-allyl-cyclopentano-[d]-4-thiazoline of the formula:

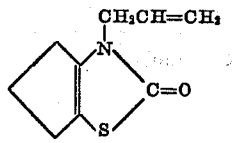

is obtained, B. P. 118–120°/0.45 mm.

*Example 24*

3.25 g. of cyclohexano-[d]-4-thiazoline-2-one are added to 100 ml. of isopropanol containing 0.485 g. of sodium. After refluxing for 15 minutes, 5.22 g. of 4-nitrophenylethylbromide are added and the solution refluxed for an additional 21 hours. The solvent is evaporated off, the residue extracted with ether and the ether evaporated off. The 3-(4-nitrophenylethyl)-cyclohexano-[d]-4-thiazoline-2-one of the formula:

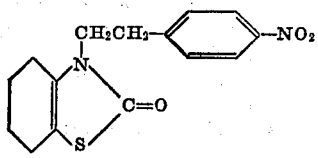

is recrystallized from a benzene solution on chilling, M. P. 145°.

*Example 25*

8.6 g. of cyclopentano-[d]-4-thiazoline-2-one are dissolved in 120 ml. of isopropanol containing 1.38 g. of sodium. The solution is refluxed for 15 minutes and an equimolar amount of piperidino-(N)-ethylchloride is added and the solution is refluxed for an additional 64 hours. The solvent is evaporated off, the residue extracted with ether and the ether evaporated off. On distillation, 8 g. of 3-[piperidino-(N)-ethyl]-cyclopentano-[d]-4-thiazoline-2-one of the formula:

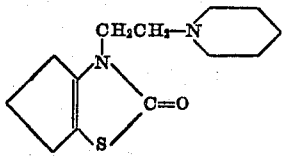

B. P. 142–143°/0.15 mm., are obtained.

The hydrochloride of the 3-[piperidino-(N)-ethyl]-cyclopentano-[d]-4-thiazoline-2-one is prepared according to the procedure described in Example 10, M. P. 254–255°, and the methiodide according to Example 13, M. P. 191–193°.

*Example 26*

3.16 g. of cyclopentano-[d]-4-thiazoline-2-one are refluxed with a solution of 0.58 g. of sodium in 80 ml. of isopropanol for 30 minutes. An equimolar amount of pyrrolidino-(N)-ethylchloride is added and the mixture is refluxed 48 hours. The 3-[pyrrolidino-(N)-ethyl]-cyclopentano-[d]-4-thiazoline-2-one of the formula:

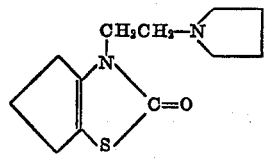

is obtained in 95 percent yield, B. P. 136–140°/0.12 mm.

The hydrochloride prepared according to the procedure given in Example 10, melts at 246–248°.

*Example 27*

2.8 g. of cyclopentano-[d]-4-thiazoline-2-one are added to 20 ml. of methanol containing 0.46 g. of sodium. To this solution there is added 2.8 g. of propargylbromide, and the mixture is refluxed for 48 hours. The methanol is evaporated off under reduced pressure and the residue extracted with ether. From the ether solution 1.4 g. of an amorphous material are filtered off. The ether is removed from the filtrate under reduced pressure, and the residue is distilled, yielding 1 g. of 3-propargyl-cyclopentano-[d]-4-thiazoline-2-one of the formula:

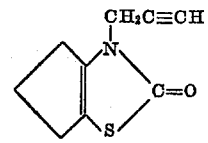

B. P. 120–122°/0.1 mm. which solidifies, M. P. 65–67°.

*Example 28*

0.46 g. of sodium is dissolved in 25 ml. of methanol, 2.82 g. of cyclopentano-[d]-4-thiazoline-2-one are added and the solution is refluxed for 15 minutes. To the clear solution are added 5.16 g. of 4-acetylaminophenoxyethylbromide and refluxing is continued for 48 hours. A solid material separates which is collected on a filter, washed with water and air dried. 3 g. of the crude material are obtained, M. P. 190–192°, which is recrystallized from ethanol, yielding 2 g. of 3-(4-acetylaminophenoxyethyl)-cyclopentano-[d]-4-thiazoline-2-one of the formula:

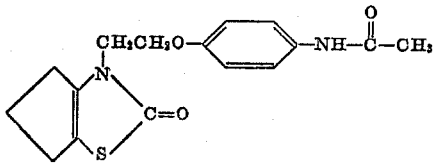

M. P. 195–196°.

The hydrochloride of the 3-(4-aminophenoxyethyl)-cyclopentano-[d]-4-thiazoline-2-one of the formula:

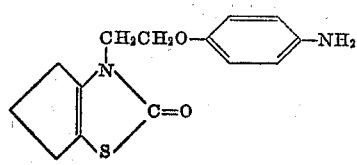

may be prepared by treating the compound obtained by the above described process with an aqueous 20 percent solution of hydrochloric acid, M. P. 196–198°.

*Example 29*

4.2 g. of cyclopentano-[d]-4-thiazoline-2-one are added to a solution of 0.6 g. of sodium in 60 ml. of isopropanol. The solution is refluxed for 15 minutes, and 7.5 g. of methyl-sulfonyl-ethylchloride are added and refluxing is continued for 3 hours. The solution is evaporated to dryness, the residue is taken up in dry toluene, the solvent is removed and the 3-(methyl-sulfonyl-ethyl)-cyclopentano-[d]-4-thiazoline-2-one of the formula:

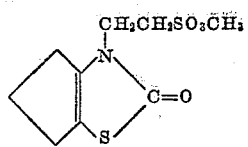

distilled, B. P. 132°/0.35 mm.

*Example 30*

4.2 g. of cyclohexano-[d]-4-thiazoline-2-one are added to 90 ml. of toluene containing 0.96 g. of sodamide. After refluxing for 6 hours, 8 ml. of epi-chlorohydrine are added and the solution refluxed for an additional 7 hours. The mixture is filtered, the solvent removed and the residue distilled to give 1 g. of 3-(2,3-oxido-propyl)-cyclohexano-[d]-4-thiazoline-2-one of the formula:

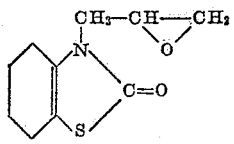

B. P. 170–175°/0.45 mm.

*Example 31*

A mixture of 15.4 g. of 2-amino-cyclohexano-[d]-thiazole and 23 g. of 4-nitrophenylethylbromide is refluxed in propanol for 20 hours. After chilling 37.5 g. of the 2-imino-3-(4-nitrophenylethyl)-cyclohexano-[d]-4-thiazoline hydrobromide are obtained, which is recrystallized from a mixture of ethanol and ether, to give the pure product, M. P. 254–258°. The free base, prepared by treatment of the hydrobromide with an aqueous solution of potassium carbonate, is treated with sodium nitrite in glacial acetic acid and the corresponding 2-nitroso-imino derivative precipitates, M. P. 154–157°. The 2-nitroso-imino-3-(4-nitrophenylethyl)-cyclohexano-[d]-4-thiazoline is slowly added to boiling xylene. The solvent is then evaporated off under reduced pressure and the 3-(4-nitrophenylethyl)-cyclohexano-[d]-4-thiazoline-2-one thus-obtained is recrystallized from ethanol. Upon treatment of an ethanolic solution of the latter with hydrogen in the presence of platinum oxide and subsequent acidification with hydrochloric acid, the hydrochloride of 3-(4-aminophenylethyl)-cyclohexano-[d]-4-thiazoline-2-one of the formula:

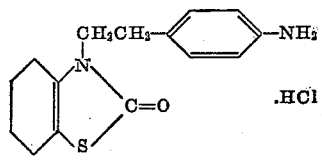

is obtained, M. P. 244–246°.

*Example 32*

A mixture of 5.25 g. of ethyl N-phenyl-thiocarbamate and 2.9 g. of α-chloro-cyclopentanone is heated at 160° for 15 minutes. After cooling, the residue is extracted with ethanol and upon concentration of the solvent a crystalline material is obtained. The 3-phenyl-cyclopentano-[d]-4-thiazoline-2-one of the formula:

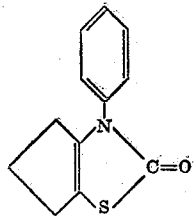

is recrystallized from ethanol, M. P. 130–131°.

*Example 33*

A mixture of 2.5 g. of ethyl N-(4-chlorophenyl)-thiocarbamate and 1.4 g. of α-chloro-cyclopentanone is heated for 15 minutes at 160° and the product is worked up as outlined in Example 32. The 3-(4-chlorophenyl)-cyclopentano-[d]-4-thiazoline-2-one of the formula:

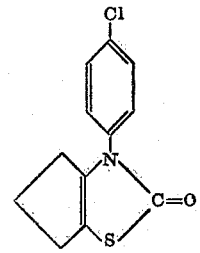

melts at 158–159°.

*Example 34*

A mixture of 2.5 g. of ethyl N-(3-chlorophenyl)-thiacarbamate and 1.4 g. of α-chloro-cyclopentanone is reacted according to the procedure given in Example 32 and the 3-(3-chlorophenyl)-cyclopentano-[d]-4-thiazoline-2-one of the formula:

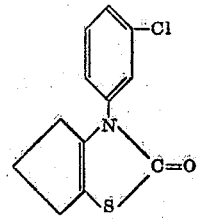

melts at 105°.

*Example 35*

4.2 g. of cyclopentano-[d]-4-thiazoline-2-one are dissolved in 50 ml. of absolute methanol containing 0.69 g. of sodium and the mixture is refluxed for 15 minutes. 5.6 g. of 2-acetoxyethylbromide are added and the solution is refluxed for 8 hours. The solvent is evaporated off, the residue extracted with ether and after the removal of the ether the 3-(2-acetoxyethyl)-cyclopentano-[d]-4-thiazoline-2-one of the formula:

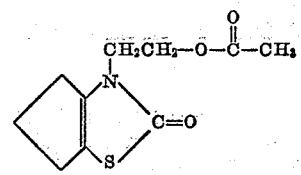

distills at 168–170°/0.1 mm.

*Example 36*

6.5 g. of 2-imino-3-methyl-cyclopentano-[d]-4-thiazoline are dissolved in 65 ml. of acetic acid. A saturated solution of sodium nitrite is added at 5° and after standing at room temperature for one hour, 65 ml. of water are added and the solution cooled. Upon concentration the 2-nitroso-imino-3-methyl-cyclopentano-[d]-4-thiazoline, melting at 125–130°, is filtered off and slowly added to boiling xylene. The solvent is removed under reduced pressure, leaving a yellow oil which is extracted with high boiling petroleum ether. On chilling the 3-methyl-cyclopentano-[d]-4-thiazoline-2-one of the formula:

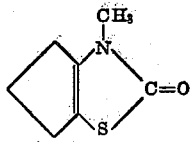

crystallizes in fine needles and is recrystallized from petroleum ether, M. P. 69–71°. The product is identical with the material obtained according to the method described in Example 8.

The starting material used in the above preparation may be obtained by treatment of a solution of the 2-amino-cyclopentano-[d]-thiazole in isopropanol with methyl iodide.

Example 37

A solution of 7.1 g. of 2-chloro-4-methyl-cyclohexanone and 5.25 g. of ethyl thiocarbamate in 15 ml. of anhydrous ethanol is refluxed for 2 hours. After concentration to one-half its original volume under reduced pressure and chilling, 2.1 g. of 6-methyl-cyclohexano-[d]-4'-thiazoline-2-one of the formula:

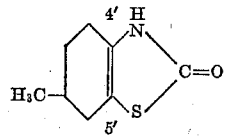

are collected and recrystallized from anhydrous ethanol, M. P. 175–177° C.

Example 38

A solution of 14.2 g. 2-chloro-4-methyl-cyclohexanone and 13.3 g. of propyl N-methyl-thiacarbamate in 25 ml. of anhydrous ethanol is refluxed for 6 hours and then concentrated under reduced pressure to two-thirds of its original volume. Upon chilling, a small amount of a high melting solid precipitates and is removed by filtration. The filtrate after further concentration and chilling yields 3.6 g. of 3,6-dimethyl-cyclohexano-[d]-4'-thiazoline-2-one of the formula:

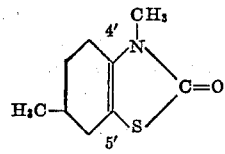

which is recrystallized from dilute ethanol, M. P. 71–73° C.

Example 39

A solution of 11.85 g. of 2-chloro-cyclopentanone and 17.9 g. of ethyl N-methyl-thiocarbamate in 30 ml. of n-propanol is refluxed for 3 and one-half hours. The propanol is removed under reduced pressure and the residue heated to 97° at 0.15 mm. A distillate boiling 50–60° and weighing 5.7 gms., is collected, which partially solidifies and is extracted with ether. The ether is removed and the residue cooled in an ice bath. 1.8 g. of the crude 3-methyl-cyclopentano-[d]-4-thiazoline-2-one are obtained and recrystallized from petroleum ether, M. P. 68–70°; the product is identical with the material obtained according to the procedure outlined in Example 8.

The ethyl N-thiocarbamate used as the starting material may be prepared as follows: A mixture of 60 g. of sodium hydroxide, 100 ml. of water, 300 ml. of ethanol (95 percent) and 105 ml. of carbon disulfide is stirred for 24 hours at room temperature. A solution of 60 g. of sodium hydroxide in 600 ml. of water is neutralized with 143 g. of solid chloroacetic acid at 10°.

The solution of the sodium chloroacetate is then added to the solution of the sodium ethyl xanthate, and the mixture stirred overnight at room temperature. The solution is then concentrated to 500 ml. at 55–60° under reduced pressure. To this solution are added 200 g. of a 25 percent aqueous solution of methyl amine. The temperature rises spontaneously to 55° and the mixture after stirring for 72 hours at room temperature is neutralized with 25 ml. of acetic acid. The upper oily layer is extracted with 250 ml. of ether and removed. The aqueous phase is extracted with three 250 ml. portions of ether, and the ether is removed from the dried combined ether extracts under reduced pressure, yielding 133.1 g. of the ethyl N-methyl-thiocarbamate.

Example 40

A mixture of 13.2 g. of α-chlorocyclohexanone, 9.4 g. of ammonium thiocarbamate and 25 ml. of absolute ethanol is refluxed for 30 minutes. The solvent is removed under reduced pressure, the residue dissolved in water and extracted with ether. The extract is dried over potassium carbonate and upon removal of the solvent, the cyclohexano-[d]-4-thiazoline of the formula:

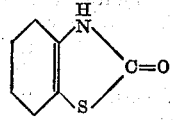

crystallizes, and is recrystallized from water, M. P. 137–138°. The product is identical with the material obtained according to the procedure outlined in Example 1.

Example 41

A mixture of 5 g. of 2-chloro-cyclohexano-[d]-thiazole, 25 ml. of absolute ethanol and 5 ml. of concentrated hydrochloric acid is heated for 15 hours at 100° C. in a sealed tube. At the end of this time, the solvent is removed under reduced pressure and the residue twice triturated with ether. After washing the oily residue with water, the crystals are collected and washed with water to give the cyclohexano-[d]-4-thiazoline-2-one, M. P. 135–138°, which shows no melting-point depression with the product obtained according to the procedure outlined in Example 1.

The 2-chloro-cyclohexano-[d]-thiazole used as the starting material may be prepared as follows: To a solution of 86 g. of 2-amino-cyclohexano-[d]-thiazole, in 600 ml. of 50 percent sulfuric acid and 750 ml. of water is added at 10° a solution of 60 g. of sodium nitrite in 200 ml. of water over a period of 30 minutes. After completion of the nitrosation an aqueous solution of 300 g. of cupric sulfate is added and the reaction mixture is subsequently heated with a solution of 145 g. of sodium chloride in water. The reaction mixture is made alkaline with a 20 percent aqueous solution of sodium hydroxide and then steam-distilled. The distillate is extracted with ether, the etheral solution filtered, dried and the ether evaporated. The residue is distilled, B. P. 74–82°/0.6 mm., yielding 30 g. of the 2-chloro-cyclohexano-[d]-thiazole.

Example 42

A solution of 3.08 g. of 2-amino-cyclohexano-[d]-thiazole and 4.0 g. of methyliodide in 20 ml. of isopropanol is refluxed for 20 hours and then chilled. The hydriodide formed is collected, dissolved in water, made alkaline with an aqueous 20 percent solution of sodium hydroxide and extracted with ether. The ether extract is dried over calcium sulfate, the ether removed and the 2-amino-3-methyl-cyclohexano-[d]-4-thiazoline is obtained as a colorless oil. The hydrochloride, prepared by adding dry hydrochloric acid gas to the etheral solution, melts at 263–264°.

1.5 g. of 2-amino-3-methyl-cyclohexano-[d]-4-thiazoline are dissolved in 15 ml. of glacial acetic acid. 2.5 g. of sodium nitrate as a saturated aqueous solution are added with cooling in an ice bath. After standing at room temperature for 3 hours, 15 ml. of water are added and the mixture chilled overnight. The yellow crystals are collected, washed with water and air dried. The 2-nitroso-imino-3-methyl-cyclohexano-[d]-thiazoline-2-one melts at 145–146°.

0.9 g. of the 2-nitroso-imino-3-methyl-cyclohexano-[d]-4-thiazoline is added in small portions to 20 ml. of boiling xylene. With each addition the solution turns orange and then becomes almost colorless. The xylene is distilled off under reduced pressure to leave a residue which solidifies and is recrystallized from water, yielding 0.75 g. of the 3-methyl-cyclohexano-[d]-4-thiazoline-2-one, identical with the product obtained according to the procedure outlined in Example 2.

*Example 43*

10 g. of cyclopentano-[d]-4-thiazoline-2-one are added to a solution of 1.49 g. of sodium in 250 ml. of isopropanol and the mixture is refluxed for 15 minutes. After addition of 16.0 g. of 4-nitrophenylethylbromide, refluxing is continued for an additional 20 hours. The reaction mixture is filtered, the solvent evaporated and the residue extracted with ether. The residue obtained from the ether extraction is taken up in benzene and upon concentration the 3-(4-nitrophenylethyl)-cyclopentano-[d]-4-thiazoline-2-one of the formula:

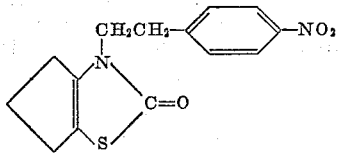

precipitates, M. P. 147°.

*Example 44*

2.1 g. of cyclohexano-[d]-4-thiazoline-2-one are refluxed for 6 hours in a mixture of 0.48 g. of sodamide in 40 ml. of toluene. After addition of 1.43 g. of 2,3-dihydroxypropylchloride refluxing is continued for an additional 4 hours. The reaction mixture is filtered, the toluene evaporated and the 3-(3,2-dihydroxypropyl)-cyclohexano-[d])-4-thiazoline-2-one of the formula:

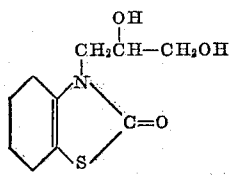

distilled, B. P. 162°/0.3 mm.

*Example 45*

To a mixture of 20 g. of 7-thiocyano-spiro(4.5)decan-6-one in 250 ml. of water is added 50 ml. of 5 N hydrochloric acid and the mixture is heated to reflux for 20 hours. After chilling overnight the oil is extracted with ether. The ether is removed and the crystalline spiro-(4.5)decano-(6,7-d')-4'- thiazoline-2'-one of the formula:

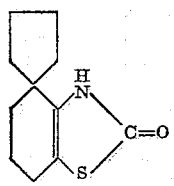

is obtained, M. P. 220–223°.

The starting material used in this procedure may be obtained as follows: 18 g. of 7-chloro-spiro(4.5)decan-6-one are treated with a mixture of 25 g. of barium thiocyanate in 75 ml. of absolute ethanol and stirred for 20 hours at room temperature. 100 ml. of water are added to the mixture, the solution extracted with ether and the ether evaporated to give the crude 7-thiocyano-spiro(4.5)decan-6-one.

*Example 46*

A mixture of 118.5 g. of 2-chloro-cyclopentanone and 143 g. of ethyl N-methyl-thiocarbamate is heated to 170° during 50 minutes and held at that temperature for one-half hour with stirring. The mixture is then heated for 25 minutes at 142–175° under reduced pressure, during which time 49.3 g. of yellow oil distilled over. The residue is extracted with hot petroleum ether (B. P. 60–90°), the extracts cooled and the crude product of M. P. 61–68° filtered off, which is subsequently distilled under reduced pressure, B. P. 110–138°/0.35 mm. The 3 - methyl - cyclopentano-[d]-4-thiazoline-2-one recrystallized from petroleum ether, M. P. 69–70° and is identical with the material obtained according to the process described in Example 8.

*Example 47*

A solution of 8.6 g. of cyclopentano-[d]-4-thiazoline-2-one in 120 ml. of isopropanol containing 1.38 g. of sodium is refluxed for 15 minutes. An equimolar amount of morpholino-(N)-ethylchloride is added and refluxing is continued an additional 64 hours. The solvent is evaporated and the residue is extracted with ether, the etheral solution dried over potassium carbonate. After evaporation of the ether the 3-(morpholino-(N)-ethyl)-cyclopentano-[d]-4-thiazoline-2-one of the formula:

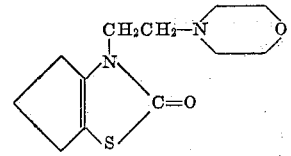

is distilled, B. P. 150–155°/0.15 mm.

*Example 48*

A solution of 2.5 g. of 2-phenylimino-3-amidino-cyclopentano-[d]-4-thiazoline-2-one hydrochloride in 125 ml. of ethanol and 10 ml. of concentrated hydrochloric acid is refluxed on the steam bath for one hour. After evaporation to dryness, ethanol is added and the crystals filtered and washed with acetone. The 3-amidino-cyclopentano-[d]-4-thiazoline-2-one hydrochloride of the formula:

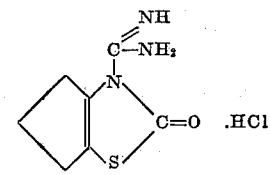

is recrystallized from acetone, M. P. 282–284°.

The 2-phenylimino-3-amidino-cyclopentano-[d]-4-thiazoline-2-one hydrochloride used as the starting material is prepared as follows: A solution of 4.5 g. of 2-chlorocyclopentanone and 5 g. of N-anilino-N'-amidino-thiourea in 100 ml. of ethanol is refluxed for one hour. The cooled reaction mixture is extracted with ether and the crystals filtered off. After recrystallization the 2-phenylimino-3-amidino - cyclopentano-[d]-4-thiazoline-2-one hydrochloride melts at 219–221°.

*Example 49*

To a solution of 7 g. of cyclopentano-[d]-4-thiazoline-2-one in 200 ml. of boiling water are added 10 ml. of a 37 percent aqueous solution of formaldehyde. The solution is slowly cooled and evaporated to about one-half of the original volume.

The crystals formed are collected and recrystallized from isopropanol. The 3-hydroxymethyl-cyclopentano-[d]-4-thiazoline-2-one of the formula:

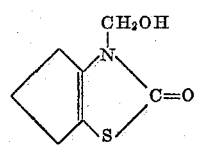

melts at 104–105°.

*Example 50*

The new 3-R-cycloalkano-[d]-4-thiazoline-2-ones of the present invention may be used as active ingredients in medicaments. Thus, the 3-methyl-cyclopentano-[d]-4-thiazoline-2-one described in Example 8, may be formulated into orally applicable tablets according to the following procedure (for 1,000 tablets):

| | G. |
|---|---|
| 3-methyl-cyclopentano-[d]-4-thiazoline-2-one | 250.00 |
| Magnesium aluminum silicate | 4.875 |
| Wheat starch dried | 37.500 |
| Purified water, q. s. | |
| Talc, U. S. P | 15.000 |
| Wheat starch | 15.250 |
| Stearic acid | 2.375 |

The 3-methyl-cyclopentano-[d]-4-thiazoline-2-one, the magnesium aluminum silicate and 27.50 g. of the wheat starch are mixed to a homogeneous mass. 10 g. of the wheat starch are suspended in 15 ml. of cold purified water and a paste is prepared by adding 60 ml. of boiling purified water. The mixed powder is granulated with this paste and the moist mass is passed through a No. 8 screen. After drying with circulating dehumidified air, the granules are broken on a No. 12 screen and mixed with the talc, the stearic acid and 15.25 g. of wheat starch. The tablets are compressed, using 13/25" dies, standard concave punches with bisected uppers, to tablets weighing each 0.325 g.

What is claimed is:
1. Cyclopentano[d]-4-thiazoline-2-one.
2. Cyclohexano-[d]-4-thiazoline-2-one.
3. Cycloheptano-[d]-4-thiazoline-2-one.
4. 3-methyl-cyclopentano-[d]-4-thiazoline-2-one.
5. 3-methyl-cyclohexano-[d]-4-thiazoline-2-one.
6. 3-methyl-cycloheptano-[d]-4-thiazoline-2-one.
7. 3,6-dimethyl-cyclohexano-[d]-4'-thiazoline-2-one.
8. 3-ethyl-cyclopentano-[d]-4-thiazoline-2-one.
9. 3-R-cycloalkano-[d]-4-thiazoline-2-one, in which R stands for a member of the group consisting of hydrogen and lower alkyl, and in which the cycloalkano portion contains from 5 to 7 carbon atoms.
10. 3-R-cycloalkano-[d]-4-thiazoline-2-one, in which R stands for hydroxy-lower alkyl, and in which the cycloalkano portion contains from 5 to 7 carbon atoms.

References Cited in the file of this patent

Erlenmeyer et al.: Helv. Chim. Acta, vol. 29, pp. 280–3 (1946).

Nozol et al.: C. A., vol. 49, column 6854 (1955).

Elderfield: "Heterocyclic Compounds," vol. 5, pp. 548–9 (1957).